UNITED STATES PATENT OFFICE.

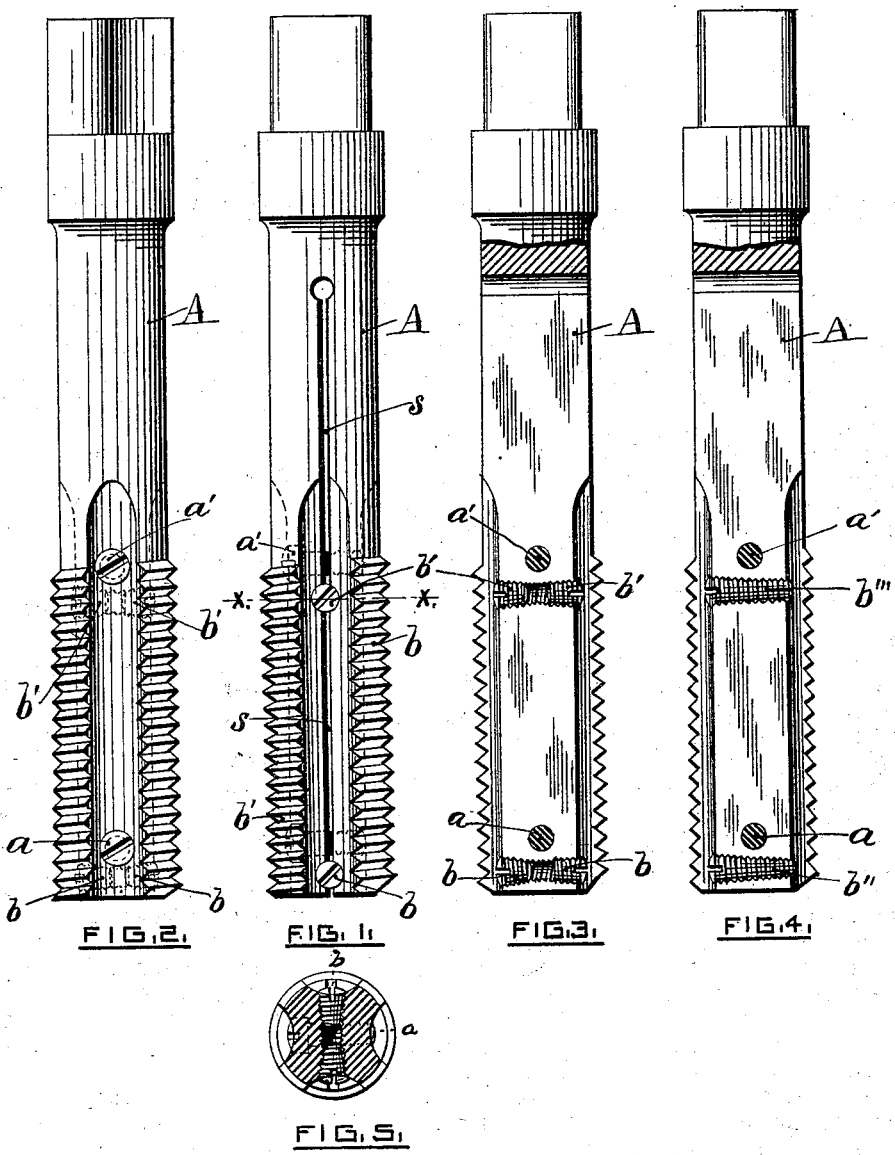

CICERO R. C. FRENCH, OF PROVIDENCE, RHODE ISLAND.

SCREW-TAP.

SPECIFICATION forming part of Letters Patent No. 275,815, dated April 17, 1883.

Application filed December 26, 1882. (No model.)

*To all whom it may concern:*

Be it known that I, CICERO R. C. FRENCH, of the city and county of Providence, and State of Rhode Island, have invented certain new and useful Improvements in Screw-Taps, of which the following is a full and correct description, reference being had to the accompanying drawings, forming a part of this specification.

This invention consists in inserting taper screws in a slot made in the tap, for the purpose of expanding it, and putting screws across the slot to hold the parts together.

Figure 1 is a side view of the tap in the plane of the slot. Fig. 2 shows the tap turned one-quarter around. Fig. 3 shows a longitudinal section taken in the plane of the slot. Fig. 4 shows the same. Fig. 5 is a cross-section through line $x$, Fig. 1.

A is the body of the tap. $s$ is a slot cut lengthwise through the threaded portion of the tap and well up into the shank.

$a$ is a stay-screw put through the tap transversely to the slot $s$ to hold the two halves of the tap together as it is fitted loosely into the part next to the screw-head, and with a screw-thread in the other part. Two taper screws, $b\ b$, are fitted with screw-threads into two taper holes intersecting the slot $s$ on opposite sides of the tap, and near its cutting end, so that when the taper screws are turned in the two parts of the tap are spread apart. These two lateral screws $b\ b$ are substituted for the single taper screw put in the end of a tap, because they prevent the parts of the tap from twisting and rocking, which they were liable to do on the single center screw, and they also enable me to put the stay-screw $a$ nearer the end, which makes that part stronger.

To further improve the tap by keeping its sides parallel and securing the integrity of its pitch, I put another stay-screw, $a'$, and two more taper screws, $b'\ b'$, at or near the upper end of the threaded part of the tap. These screws are fitted into the tap and operate in like manner to those near the end already described.

In the place of two taper screws, $b\ b$ or $b'\ b'$, one taper screw, $b''$, Fig. 4, long enough to reach through the tap and fitted to screw its whole length, may be used. These screws operate in like manner and produce the same effect as the shorter screws.

In operating the improvement in the case of a new tap that does not come up to the exact size required, or an old tap somewhat worn by loosening the stay-screws $a\ a'$ and turning in the screws $b\ b'$, (or $b''$,) the tap may be expanded to size, and by operating one set of the screws to the exclusion of the other set the tap may be made to taper slightly in either direction.

Having thus described my improvement, what I claim as my invention, and desire to secure by Letters Patent, is—

1. As a new article of manufacture, a screw-tap constructed substantially as shown and described—that is, with a slot extending lengthwise and centrally entirely through its cutting part, and having taper screws inserted in the slot to separate the two parts, and transverse stay-screws to draw them together, substantially as set forth.

2. A screw-tap having a slot extending lengthwise and centrally entirely through its threaded or cutting part into the shank above, in combination with means for expanding and contracting the parts, substantially as and for the purpose set forth.

CICERO R. C. FRENCH.

Witnesses:
FRANK BULLIVANT,
BENJ. ARNOLD.